United States Patent [19]

Groenhof et al.

[11] Patent Number: 4,640,792

[45] Date of Patent: Feb. 3, 1987

[54] SILICONE BRAKE FLUID HAVING REDUCED AIR SOLUBILITY

[75] Inventors: Eugene D. Groenhof, Freeland; David J. Romenesko; Rick D. Streu, both of Midland, all of Mich.

[73] Assignee: Dow Corning Corporation, Midland, Mich.

[21] Appl. No.: 801,448

[22] Filed: Nov. 25, 1985

[51] Int. Cl.$^4$ .......................................... C10M 107/50
[52] U.S. Cl. .................... 252/78.3; 252/573; 556/450; 556/453; 556/465
[58] Field of Search ............... 252/78.3, 573, 49.6; 556/450, 453, 465

[56] References Cited

U.S. PATENT DOCUMENTS

| | | | |
|---|---|---|---|
| 2,398,187 | 4/1946 | McGregor et al. | 252/78 |
| 3,418,353 | 12/1968 | Brown, Jr. | 556/453 |
| 3,440,263 | 4/1969 | Brennan | 556/453 |
| 3,671,433 | 6/1972 | Brenner | 252/49.6 |
| 3,673,089 | 6/1972 | Wright | 252/49.6 |
| 4,137,189 | 1/1979 | Holbrook et al. | 252/75 |
| 4,443,351 | 4/1984 | Keil | 252/75 |

OTHER PUBLICATIONS

Holbrook, G. W., "Alpine Testing of Silicone Brake Fluids," *SAE Technical Paper Series* 810803 (Jun. 8–12, 1981).

"Brake Fluid, Silicone, Automotive All Weather, Operational and Preservative," *Military Specification MIL-B-46176*, (3/27/78).

Browning, G. R., "Performance Characteristics of Silicone Based Brake Fluids," *Society of Automotive Engineers* 740128, (2/25–3/1/74).

"Federal Motor Vehicle Safety Standards and Regulations," *Motor Vehicle Safety Standard No. 116*, (Supplement 80-10/23/74).

*Primary Examiner*—Robert A. Wax
*Attorney, Agent, or Firm*—Alexander Weitz

[57] ABSTRACT

A random siloxane copolymer composition, and a process for using the composition in a hydraulic brake system of a vehicle, is described. The random copolymer consists essentially of alkylmethylsiloxane and dimethylsiloxane units, wherein said alkyl group contains from five to ten carbon atoms, and the viscosity of said fluid is 15–50 cS at 25° C. Within a relatively narrow compositional range, these fluids dissolve at least 15% less air than comparable polydimethylsiloxane fluids. Moreover, the copolymer may be readily formulated into brake fluid compositions which meet Department of Transportation (DOT 5) and, in the case of preferred compositions, Military (MIL-B-46176) specifications. The potential benefit of reduced air solubility is an improved margin of safety under harsh driving conditions.

22 Claims, No Drawings

SILICONE BRAKE FLUID HAVING REDUCED AIR SOLUBILITY

BACKGROUND OF THE INVENTION

The present invention relates to a brake fluid composition consisting essentially of a copolymer of alkylmethylsiloxane and dimethylsiloxane. It further relates to a method of employing said copolymer composition in an automotive brake system.

The benefits of silicones for use as hydraulic and brake fluids were recognized early in the development of these unique materials. McGregor et al., U.S. Pat. No. 2,398,187, disclosed the broad generic use of dialkyl siloxane polymer and copolymer fluids for such applications on the basis of their slight change in viscosity with temperature, low pour point and high flash point. In addition, McGregor et al. recognized other beneficial properties, including: low volatility, low hygroscopicity, little or no corrosive or decomposing effect upon metal and rubber hydraulic device components, and little or no gasification or solidification tendencies under the higher or lower temperature conditions encountered in the various types of hydraulic applications.

More recently, commercial attention has focused on polydimethylsiloxanes (PDMS) as viable alternatives to the glycol-based polyethers traditionally employed in automotive brake fluid systems. This is not surprising, since PDMS represents the most ubiquitous and inexpensive silicone of manufacture. Its virtues as a brake fluid, relative to the glycols, have been extolled, e.g., by G. R. Browning (Paper 740128 presented at SAE Automotive Engineering Congress, Detroit, February, 1974). This reference points out a further key advantage of a high boiling polydimethylsiloxane, namely that this fluid will not absorb or dissolve a significant amount of water, contrary to a glycol fluid. Such inevitable humidification of glycol fluids with time has been found to result in reduced boiling point and, ultimately, to lead to the potentially dangerous condition of vapor lock and loss of brake capability.

These, and other considerations of beneficial properties have helped pave the path for enactment of a separate category of specifications by the Department of Transportation for low water tolerant brake fluids, known as DOT 5. These requirements are further defined by Federal Motor Vehicle Safety Standard No. 116 and were published in the Federal Motor Vehicle Safety Standards and Regulations, Supplement 80, Oct. 23, 1974, which is hereby incorporated by reference and henceforth referred to simply as DOT 5.

Notwithstanding all their virtues, polydimethylsiloxane fluids retained one major disadvantage for certain specialized applications. Their relatively high (about −50° C.) solidification temperature precluded their acceptance for utilization as an all-around (arctic/tropic) military brake fluid. Such disadvantage was engineered out of these fluids by copolymerizing mono- and trifunctional units with the difunctional siloxanes to attain a non-regular structure (i.e., a non-linear siloxane) and thus greatly reducing the tendency to crystallize. Silicone brake fluids of this capability have also been defined in terms of rigid specifications, this time by Military Specification MIL-B-46176, which is hereby incorporated by reference and henceforth simply referred to as MIL. This specification is more demanding than DOT 5, particularly in the areas of low temperature fluidity/appearance, flashpoint, vapor lock temperature and swell of rubber seal components.

An example of a non-linear siloxane was disclosed by Holbrook et al. in U.S. Pat. No. 4,137,189. In this case, the object was to provide an hydraulic fluid which could be utilized in all fluid transmission systems of an automobile. This application demanded greater lubricity on metals than ordinarily required in brake fluid applications. It should, however, be recognized that some lubricity is needed to prevent scoring of cylinders in brake systems. Generally, the lubricity of polydimethylsiloxanes is only marginal. Thus, Holbrook et al. disclosed a composition consisting essentially of a non-linear siloxane fluid, a chlorendate diester and a lubricant additive selected from dithiocarbamates and phosphorodithioates of antimony and lead.

A variation on the teachings of Holbrook et al. was disclosed by Keil in U.S. Pat. No. 4,443,351, wherein it was suggested that the less expensive, linear polydimethylsiloxanes, or copolymers of PDMS with alkylmethyl siloxanes, be blended with a chlorendate diester, a lubricant additive (as above) and a block copolymer of polydimethylsiloxanepolybutadiene. Such compositions were utilized as concentrates of said lubricant additives, which could be added to other siloxane hydraulic fluids or used independently, and provided settling stability (of the additives) over a wide temperature range.

Yet another means of enhancing the lubricity of siloxanes was disclosed by Brenner in U.S. Pat. No. 3,671,433. Alkylmethyl polysiloxane fluids were mixed with small quantities of dodecenyl succinic acid. It was shown that when the alkyl groups contained from 6 to 18 carbon atoms superior lubrication properties resulted. Unfortunately, in addition to being considerably more expensive to produce than PDMS, these fluids have been shown to cause unacceptably high swell in rubber seal components. Moreover, they generally do not pass DOT 5, much less MIL specifications, making them less attractive brake fluid candidates.

It is thus recognized that high boiling polydimethylsiloxane fluids demonstrate great advantage in applications requiring a stable and versatile automotive brake fluid. Yet, as automobile designs tend towards more efficient and compact engines and brake systems, there is increasing need for improved brake fluids which can operate at the higher temperatures associated with such congested surroundings. This is further underscored by the significant temperature elevation imparted to brake fluids during, e.g., prolonged start-stop driving or descent on long, steep grades. Holbrook (Paper 810803, presented at SAE Passenger Car Meeting, Dearborn, Mich., June, 1981), for example, has shown that such driving conditions can lead to fluid temperature increases of well over 100° C. above ambient.

Thus, once mechanical aspects of an automotive brake system have been determined, there remain three key temperature-related contributions to the total brake pedal travel (brake system compliance) due to the brake fluid itself: (1) compressibility of the fluid, (2) volatility of the fluid and (3) dissolved permanent gases, typically air, in the fluid. Although it is generally desirable to keep the brake system compliance as low as possible for a highly responsive brake system, variation in compressibility is generally smooth over the temperatures in question, and is, therefore, of lesser concern than the other two factors. The second factor has already been mentioned in the form of vapor lock, wherein some component (or indeed the fluid itself) suddenly vaporizes (boils) to form a vapor pocket due to high temperature. The last category, as far as is known to applicants, has not been addressed prior to the instant invention, but can potentially lead to increased pedal travel. For example, the fluid in an hydraulic line in proximity to a disk brake may be rapidly heated by repetitive braking. Consequently, some of the dissolved air must come out of solution to establish a new (lower) equilibrium air concentration in the fluid. If such a change is sufficiently abrupt, bubbles can nucleate to form air pockets in the bulk fluid. Such air pockets would have to be compressed out before a caliper (fitted with brake pads) could be activated by the brake pedal to frictionally engage the brake disk. This, in turn, could result in loss of braking performance. Furthermore, reduction of ambient atmospheric pressure could induce a similar undesirable effect. Thus, despite all the advantages of PDMS in brake fluid applications, these materials, whether branched or linear, allow considerably greater air solubility than the conventional glycol-based fluids.

It has now been discovered that significant reduction in gas, typically air, solubility can be achieved in certain random copolymers of dimethylsiloxane with alkylmethylsiloxane. Moreover, this can be accomplished while retaining other desirable features of PDMS fluids for brake fluid applications. In other words, these fluids can still be formulated to meet the requirements set forth in the aforementioned DOT 5 and MIL specifications, and, indeed, often surpass them. The potential benefit of such a reduction in air solubility is an improved margin of safety under harsh driving conditions, such as recited above.

SUMMARY OF THE INVENTION

This invention relates to an hydraulic fluid composition, consisting essentially of: a random silicone copolymer having the general formula $(R')_3—SiO[R(CH_3)SiO]_x[(CH_3)_2SiO]_y—Si(R')_3$, wherein R is selected from the group of alkyl radicals having five to ten carbon atoms, such that the ratio, defined by $x/(x+y)$, is between 0.5 and 1.0 when R is pentyl; said ratio is between 0.25 and 0.7 when R is hexyl; said ratio is between 0.1 and 0.7 when R contains from seven to ten carbon atoms; R' is an organic radical selected from the group consisting of an alkyl group having one to eight carbon atoms and phenyl; and said copolymer has a viscosity between 15 and 50 cS at 25° C.

It further relates to a process for transmitting force from the brake pedal means of a vehicle through hydraulic line means connected to master brake cylinder means and to a brake activating means comprising substantially filling said hydraulic line means, said master cylinder means, and said activating means with a fluid consisting essentially of the random silicone copolymer described above.

DETAILED DESCRIPTION OF THE INVENTION

The present invention relates to a narrow range of alkylmethylsiloxane-dimethylsiloxane copolymer brake fluid compositions, wherein a reduction in air solubility of over 15% relative to linear or branched polydimethylsiloxanes (PDMS) of comparable molecular weight is achieved. Moreover, this result is obtained without sacrifice of the other desirable features of PDMS fluids in regard to meeting the rigid requirements of the DOT 5 and, on occasion, the MIL brake fluid specifications, wherein these copolymers, also referred to as base fluids, are mixed with various minor components to provide completely formulated brake fluids.

The copolymers of this invention may be represented by the general formula $(R')_3—SiO[R(CH_3)SiO]_x[(CH_3)_2SiO]_y—Si(R')_3$ wherein, R is a linear or branched alkyl group having 5 to 10 carbon atoms, such as n-pentyl, isopentyl, n-hexyl, n-heptyl, n-octyl, diisobutyl (2,4,4-trimethypentyl), n-nonyl or n-decyl. Straight chain alkyl groups are preferred over branched structures. The R' groups on the terminal silicon atoms can be identical or different short chain alkyl groups having from one to eight carbon atoms, such as methyl, ethyl, propyl, butyl, hexyl or octyl, with methyl being preferred. Alternatively, R' may be an aryl group such as phenyl. The copolymers must be of the random (i.e., non-block) type in order to satisfy the low temperature requirements set forth in DOT 5 or MIL (i.e., they should not solidify at the prescribed test conditions).

The operability of the instant invention depends upon the average molar ratio of alkylmethylsiloxane to dimethylsiloxane in the random copolymer, excluding the end groups. This value, calculated from the expression $x/(x+y)$, will be simply referred to as "ratio" hereinafter. When said alkyl group R is pentyl, a ratio between 0.5 and 1.0 results in copolymers which have air solubilities at least 15% lower than that of polydimethylsiloxane of comparable molecular weight. Air solubility of linear or branched PDMS, having a degree of polymerization of about 25 and a viscosity of about 20 cS, is approximately 15.4% by volume at normal temperature and pressure (i.e., 25° C. and 1 atmosphere) while the copolymers of the present invention exhibit air solubilities of 13.1%, or less. These random copolymers further demonstrate physical properties compatible with being formulated into a silicone brake fluid which would pass the DOT 5 specification. Similarly, when R is hexyl, and the ratio is between 0.25 and 0.7, or when R is heptyl, octyl, nonyl or decyl, and the ratio is between 0.1 and 0.7, resultant properties are within the scope of the present invention. Simultaneously, the values of x and y in the above general formula are chosen such that the viscosity of the fluid at 25° C. ranges from about 15 to about 50 centistokes (cS). Preferably, the viscosity is about 15-25 cS. Preferred embodiments of the invention result when R' is methyl and the ratio $x/(x+y)$ is: between 0.6 and 0.7 when R is n-pentyl; between 0.3 and 0.6 when R is n-hexyl; between 0.1 and 0.5 when R is n-octyl; and the ratio is between 0.1 and 0.4 when R is n-decyl.

Most preferred embodiments of the invention exhibit physical properties compatible with formulation into brake fluids which would pass the rigid MIL specifications. These compositions include the copolymers wherein R is n-decyl and the ratio $x/(x+y)$ is 0.1 to 0.3, wherein R is n-octyl and the ratio is 0.1 to 0.3, and wherein R is n-hexyl and the ratio is 0.3 to 0.6, the n-hexyl copolymer being most preferred.

Additionally, copolymers wherein the R group is phenyl are compatible with being formulated into brake fluids which would pass DOT 5 and MIL. These fluids also have the reduced air solubility within the ratio range recited for the hexyl copolymer. However, these materials have the disadvantages of higher production costs and reduced lubricity.

Two further advantages of the copolymer brake fluids of the instant invention are noted. First, as mentioned above, incorporation of even small amounts of alkylmethylsiloxanes in PDMS results in improved lubricity. This may be observed during "stroke" testing, wherein a formulated brake fluid is repeatedly stroked under controlled conditions of temperature and pressure in a simulated automotive brake system. After the prescribed number of cycles, the mechanical parts are inspected for wear and scoring and the rubber seals inspected for disintegration and swell according to either DOT 5 or MIL specification. Second, the copolymer fluids exhibit reduced compressibilities relative to polydimethylsiloxane. This reduces the overall brake system compliance.

Various additives must be added to the random copolymer (base fluid) of the instant invention to produce a completely formulated brake fluid. It is in this formulated form that the fluids are subjected to the full complement of either DOT 5 or MIL tests.

Rubber swell additives, such as di(2-ethylhexyl) azelate or tributyl phosphate, may be incorporated at about 1 to 5% by weight. These are typically employed with PDMS since these base fluids tend to shrink rubber components by leaching out plasticizers from the latter. Generally, less swell additive is needed as alkylmethyl content, or size of the R group, is increased.

Water tolerance additives, such as diethylene glycol methyl ether, may be incorporated at about 0.05 to 0.4% by weight. These compounds associate with whatever little water is dissolved by the base fluid and prevent haze formation at extremely low temperatures. Antioxdants such as p,p'dioctyldiphenylamine and butylated hydroxytoluene at concentrations of about 0.1 to 0.5% by weight are generally required to protect the alkyl groups from oxidation at elevated operating temperatures as well as to protect the rubber components from oxidation. Dyes are also usually incorporated at low levels, mainly for identification purposes.

Other, non-essential additives, such as fire retardants, viscosity modifiers, antiwear additives and corrosion inhibitors may also find utility in combination with the base fluids (copolymers) of the present invention.

It is believed that the narrow range of operability of the present invention results from the opposing effects associated with the goals of the invention. On the one hand, a lower air solubility than that of polydimethylsiloxane (PDMS) is desired in order to limit gas pocket formation under harsh driving conditions. The instant invention clearly demonstrates that this can be achieved by copolymerizing alkylmethylsiloxanes with dimethylsiloxane. Indeed, when the R group contains more than six carbon atoms, relatively little of the alkylmethylsiloxane was required to effect a 15% reduction in air solubility relative to PDMS. On the other hand, increasing the alkylmethylsiloxane content towards 100%, often results in polymers which are unsatisfactory in that these base fluids can not be formulated to conform to DOT 5 or MIL specifications. Two key properties affected are low temperature appearance and fluidity. This is particularly the case for R groups larger than octyl. Such compositions tend to fail either the "cold soak" test of DOT 5 or the fluidity test of MIL, or both, notwithstanding further reductions in air solubility. The DOT 5 test requires the fluid to remain essentially clear after exposure in a chamber at −40° C. for 144 hours, and at −50° C. for 6 hours. The MIL test requires the fluid viscosity to be no more than 900 cS at −55° C.

Furthermore, as alkylmethylsiloxane content of the copolymer is increased, swell of rubber brake system components also increases. Although this is generally not critical for DOT 5 considerations, it is a major constraint in meeting the requirements of MIL since, among other criteria, MIL limits the volumetric swell of EPDM rubber to the narrow range of 0-10%.

Those skilled in the art will recognize that, although some of the requirements of DOT 5 and MIL can be met by varying molecular weight of the base fluid and/or formulating with additives, the key properties addressed above are not usually amenable to such manipulation. Thus, for example, if a base fluid (i.e., the siloxane copolymer of the instant invention) tends to solidify at low temperatures or to swell rubber components excessively, formulating that fluid into a complete brake fluid for testing per DOT 5 or MIL will not generally result in acceptability. Accordingly, those base fluid compositions which did not pass the key property requirements detailed above, were judged incompatible with DOT 5 or MIL, as applicable.

The copolymers of the present invention may be prepared by methods which are well known in the art. For example, they may be synthesized by the cohydrolysis, and subsequent condensation, of the appropriate diorganodialkoxysilanes or diorganodichlorosilanes. In this approach, a desired quantity of an end-capping reactant, (R')₃SiZ, is included in the reaction mixture to regulate the molecular weight of the product (i.e., more end-capping reactant yields a lower molecular weight product). The R' groups of said end-capping reactant have been previously defined. The Z group is a hydrolyzable species such as halide (e.g., chloride, fluoride or bromide) or alkoxy (e.g., methoxy, ethoxy).

Another, and preferred, method comprises the steps of preparing an SiH-functional random copolymer intermediate of the general formula

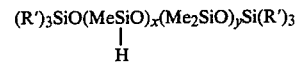

wherein Me represents the methyl radical and R' has been previously defined. These intermediates are well known in the art and may be prepared by the acid equilibration of a commercially available poly(methylhydrogensiloxane) with cyclic dimethylsiloxanes, in various ratios. Molecular weight of the intermediate may be controlled by incorporating the proper level of an end-capping monomer, such as hexamethyldisiloxane. The SiH-functional intermediate is then reacted with about a 25% excess of the desired alkene to chemically add the latter to the SiH groups of the former. This addition reaction is catalyzed by platinum complexes known in the art.

This invention also relates to an improved process for transmitting hydraulic pressure from a brake pedal means of an automotive vehicle through hydraulic cylinder means and hydraulic line means to hydraulically-activated brake means wherein the hydraulic fluid consists essentially of random copolymers which may be represented by the general formula (R')₃—SiO[R(CH₃)SiO]ₓ[(CH₃)₂SiO]ᵧ—Si(R')₃, wherein R, R', x and y have been previously defined.

The following examples are offered for the purpose of illustrating the present invention and are not to be construed as limiting the claimed invention.

EXAMPLE 1

To a flask, equipped with a stirrer, thermometer, condenser, addition funnel and means for purging with dry nitrogen gas, there was added 1000 grams of a random siloxane copolymer of the following average composition:

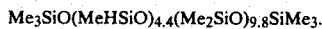

The copolymer was heated to about 68° C. and 368 g (25% excess) hexene-1 was added in two steps. First about 50 ml of the hexene-1 was added. Heating was discontinued and 0.35 cc of 0.1M hexachloroplatinic acid in isopropyl alcohol solution was added, at which point the temperature rose to 92° C. within two minutes. The remaining hexene-1 was then added dropwise over the course of one hour, such that the final temperature was 106° C. The contents were refluxed (134-138° C.). After 3 hours, 0.35 cc of chloroplatinic acid was added and reflux was continued for 2 more hours.

The product was vacuum stripped, first at 100 mm mercury to a pot temperature of 43° C. (primarily to remove the excess hexene-1), then at 20 mm mercury to a pot temperature of 250° C. (to achieve a high flash point). The product, which at this point had a residual SiH level of less than 10 ppm, was clarified by mixing with about 14 grams of Fullers Earth and subsequently filtered under pressure. The product had the approximate average composition:

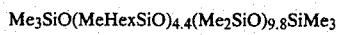

wherein, Me and Hex represent the methyl and n-hexyl groups, respectively.

EXAMPLE 2

Other base fluids within the scope of this invention were prepared by methods similar to the synthesis described in Example 1. These compositions are presented in Table 1.

EXAMPLE 3

All the base fluids, as well as five comparative fluids, were tested for low temperature appearance (cold soak) according to methods described in Federal Motor Vehicle Safety Standard No. 116 (DOT 5). Briefly, this procedure prescribes the examination of 100 ml of fluid which has been stored at −40° C. for 144+/−4 hours in a 4-ounce bottle having a diameter of 37.0+/−0.05 mm. The procedure is then repeated at −50° C. for 6 hours +/−12 minutes. The fluid must remain clear and free of sludging, sedimentation, crystallization or stratification in order to pass this test.

The base fluids were also tested according to Military Specification MIL-B-46176 (MIL) for low temperature viscosity and EPDM rubber swell. The kinematic viscosity is determined at −55° C. using a standard tube viscometer and must be no greater than 900 cS in order to pass this test. Swell of EPDM rubber cups was determined by immersion in the fluids at 120°+/−2° C. for 70+/−2 hours. Volume swell is calculated from weight changes, as measured at 25° C., and must be between 0 and 10% to pass this test.

Finally, these materials were subjected to indirect air solubility measurements by polarography as follows. Eight milliliters of an electrolyte, consisting of a 0.2 molar solution of tetrabutyl ammonium perchlorate in chlorobenzene, and one milliliter of benzene were introduced into the measuring cell of a standard polarograph. This mixture was purged of dissolved oxygen by bubbling nitrogen through it for about 5 minutes. A one milliliter sample of the given silicone copolymer was then added and the volumetric oxygen content therein was determined from the resulting current versus voltage curve. This value was divided by 0.21 (i.e., oxygen content of air was assumed to be 21% by volume) to obtain the air solubility. The results are presented in Table 1.

TABLE 1

| | Ratio x/x + y | Air Solubility (Volume %) | Viscosity (cS) @ 25° C. | Viscosity (cS) @ −55° C. | Cold Soak @ −50° C. | EP Rubber @ 120° C. (Volume %) |
|---|---|---|---|---|---|---|
| BASE FLUIDS OF THE PRESENT INVENTION (Random Copolymer) | | | | | | |
| Isoamylmethyl/dimethyl | 0.6 | 12.8 | 32 | 2339 | Pass | 4.62 |
| n-Hexylmethyl/dimethyl | 0.3 | 12.5 | 25.6 | 756 | Pass | 2.87 |
| n-Hexylmethyl/dimethyl | 0.6 | 11.9 | 29.9 | 1882 | Pass | 6.92 |
| n-Octylmethyl/dimethyl | 0.1 | 12.7 | 40 | 798 | Pass | |
| n-Octylmethyl/dimethyl | 0.3 | 12.1 | 29.5 | 1392 | Pass | 5 |
| n-Octylmethyl/dimethyl | 0.4 | 12.3 | 28.5 | 1464 | Pass | 8.8 |
| diisobutylmethyl/dimethyl | 0.3 | 12.9 | 37.2 | 1678 | Pass | 2.7 |
| n-Decylmethyl/dimethyl | 0.1 | 12.8 | 41.4 | 1040 | Pass | 0.96 |
| n-Decylmethyl/dimethyl | 0.3 | 12.2 | 39.8 | 2780 | Pass | 7.2 |
| COMPARATIVE FLUIDS | | | | | | |
| Poly(dimethylsiloxane) | 0 | 15.4 | 20 | | | |
| Random copolymer | | | | | | |
| n-Butylmethyl/dimethyl | 0.3 | 15 | 22 | 449 | Pass | 1.67 |
| n-Butylmethyl/dimethyl | 0.6 | 13.6 | 25.1 | 718 | Pass | 1.61 |
| Poly(di-n-decylsiloxane) | 1.0 | 11.4 | 24.5 | | Fail | 35.5 |
| Poly(diisobutylmethylsiloxane) | 1.0 | 12.2 | 32.2 | 5304* | Fail | 58.9 |

*measured at −40° C.

All base fluids of the present invention had air solubility values below 13.1% (i.e., more than a 15% reduction relative to the poly(dimethylsiloxane) comparative fluid). The best comparative fluid, which would pass the cold soak test of DOT 5, was a random copolymer of n-butylmethylsiloxane and dimethylsiloxane wherein the ratio of x/(x+y) was 0.6. This fluid had an air solubility of 13.6%. When base fluids of this invention having viscosities within the preferred range of 15-25 cS at 25° C. are prepared, the corresponding viscosities at −55° C. are below 900 cS, and therefore compatible with the MIL specification.

We claim:

1. A hydraulic fluid composition, consisting essentially of: a random silicone copolymer having the general formula $(R')_3$—$SiO[R(CH_3)SiO]_x[(CH_3)_2SiO]_y$—$Si(R')_3$, wherein R is selected from the group of alkyl radicals having five to ten carbon atoms, such that the ratio, defined by $x/(x+y)$, is between 0.5 and 0.7 when R is pentyl; said ratio is between 0.25 and 0.7 when R is hexyl; said ratio is between 0.1 and 0.7 when R contains from seven to ten carbon atoms; R' is an organic radical selected from the group consisting of an alkyl group having one to eight carbon atoms and phenyl; and said copolymer has a viscosity between 15 and 50 cS at 25° C.

2. The composition of claim 1, wherein R is pentyl.
3. The composition of claim 1, wherein R is hexyl.
4. The composition of claim 1, wherein R is heptyl.
5. The composition of claim 1, wherein R is octyl.
6. The composition of claim 1, wherein R is nonyl.
7. The composition of claim 1, wherein R is decyl.
8. The composition of claim 2, wherein said ratio is between 0.6 and 0.7, and R' is methyl.
9. The composition of claim 3, wherein said ratio is between 0.3 and 0.6, and R' is methyl.
10. The composition of claim 5, wherein said ratio is between 0.1 and 0.5, and R' is methyl.
11. The composition of claim 7, wherein said ratio is between 0.1 and 0.4, and R' is methyl.
12. A process for transmitting force from the brake pedal means of a vehicle through hydraulic line means connected to master brake cylinder means and to a brake activating means comprising substantially filling said hydraulic line means, said master cylinder means, and said activating means with a fluid consisting essentially of a random silicone copolymer of the structure $(R')_3-SiO[R(CH_3)SiO]_x[(CH_3)_2SiO]_y-Si(R')_3$, wherein R is selected from the group of alkyl radicals having five to ten carbon atoms, such that the ratio, defined by $x/(x+y)$, is between 0.5 and 0.7 when R is pentyl; said ratio is between 0.25 and 0.7 when R is hexyl; said ratio is between 0.1 and 0.7 when R contains from seven to ten carbon atoms; R' is an organic radical selected from the group consisting of an alkyl group having one to eight carbon atoms and phenyl; and said copolymer has a viscosity between 15 and 50 cS at 25° C.

13. The process of claim 12, wherein R is pentyl.
14. The process of claim 12, wherein R is hexyl.
15. The process of claim 12, wherein R is heptyl.
16. The process of claim 12, wherein R is octyl.
17. The process of claim 12, wherein R is nonyl.
18. The process of claim 12, wherein R is decyl.
19. The process of claim 13, wherein said ratio is between 0.6 and 0.7 and R' is methyl.
20. The process of claim 14, wherein said ratio is between 0.3 and 0.6 and R' is methyl.
21. The process of claim 16, wherein said ratio is between 0.1 and 0.5 and R' is methyl.
22. The process of claim 18, wherein said ratio is between 0.1 and 0.4 and R' is methyl.

* * * * *